United States Patent [19]
Kanbara et al.

[11] Patent Number: 5,388,026
[45] Date of Patent: Feb. 7, 1995

[54] ELECTROLYTIC CAPACITOR AND METHOD FOR PRODUCING THE SAME

[75] Inventors: Teruhisa Kanbara, Ikeda; Yuichiro Tsubaki, Kyoto; Tadashi Sotomura, Kashiwara; Kenichi Takeyama, Osaka, all of Japan

[73] Assignee: Matsushita Electric Industrial Co., Ltd., Kodama, Japan

[21] Appl. No.: 171,766

[22] Filed: Dec. 22, 1993

Related U.S. Application Data

[63] Continuation of Ser. No. 936,387, Aug. 28, 1992, abandoned.

[30] Foreign Application Priority Data

Oct. 21, 1991 [JP] Japan .................................. 3-272294
Apr. 6, 1992 [JP] Japan .................................. 4-083545

[51] Int. Cl.$^6$ .................................................. H01G 9/02
[52] U.S. Cl. ............................................. 361/525; 361/523
[58] Field of Search ................ 361/525, 311, 312, 502, 361/523, 527

[56] References Cited

U.S. PATENT DOCUMENTS

| | | | |
|---|---|---|---|
| 4,009,424 | 2/1977 | Itoh | 361/433 |
| 5,112,876 | 5/1992 | Tairaka et al. | 521/167 |
| 5,146,391 | 9/1992 | MacFarlane et al. | 361/525 |
| 5,153,820 | 10/1992 | MacFarlane et al. | 361/525 |
| 5,204,397 | 4/1993 | Maki et al. | 524/401 |
| 5,212,622 | 5/1993 | MacFarlane et al. | 361/305 |

FOREIGN PATENT DOCUMENTS 1503425 11/1989 Japan .
8808612 11/1988 WIPO .

OTHER PUBLICATIONS

S. Chandra et al, "Studies on Ammonium Perchlorate Doped Polyethylene Oxide Polymer Electrolyte", Solid State Ionics 40/41 (1990) pp. 651–654.

"Electric Conductive Polymers" by Naoya Ogata, published by Kodansha Scientific Inc., Japan 1990, pp. 95–109.

*Primary Examiner*—Marvin M. Lateef
*Attorney, Agent, or Firm*—Cushman, Darby & Cushman

[57] ABSTRACT

An electrolyte of electrolytic capacitor comprises at least one ammonium salt and at least one polyether polyol having a skeletal structure represented by the formula:

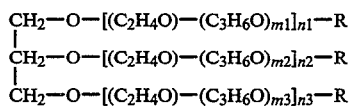

where, each of Rs independently represents a hydrogen atom, an optionally substituted isocyanate residue or acrylic residue which may be the same as or different from one another; $m_1$, $m_2$, $m_3$, $n_1$, $n_2$ and $n_3$ each represent a positive integer, and the ends of the isocyanate residues or the acrylic residues are 3-dimensionally linked.

15 Claims, 10 Drawing Sheets

ELECTROLYTIC CAPACITOR AND METHOD FOR PRODUCING THE SAME

This is a continuation of application No. 07/936,387, filed on Aug. 28, 1992, which was abandoned upon the filing hereof.

FIELD OF THE INVENTION AND RELATED ART STATEMENT

1. Field of the Invention

The present invention relates to an electrolytic capacitor and method for production of the same. In particular, it is concerned with an electrolytic capacitor of a low impedance and a good temperature characteristics as well as of an excellent durability.

2. Description of the Related Art

Hithertofore, an electrolytic capacitor has conventionally been constituted with a liquid electrolyte disposed between a metal electrode such as of aluminum and a dielectric substance such as aluminum oxide. The dielectric substance has generally been formed by anodizing the surface of an aluminum anode; and the liquid electrolyte has been obtained by dissolving an ammonium salt in a high boiling point organic solvent such as ethylene glycol. The capacitors employing such liquid electrolyte are however unable to have a reliability for a long service life because of their drawbacks such as leakage or evaporation of the electrolyte.

In order to solve the problem, an electrolytic capacitor constituted with a polymer electrolyte having a least fear of the leakage or evaporation of the electrolyte has been proposed in Tokkal (Japanese Unexamined Patent Publication) Hei 1-503,425. This publication discloses an electrolytic capacitor which employs a polymer electrolyte prepared by dissolving or dispersing an alkali metal salt in a polymeric substance which includes a mixture of a siloxane alkylene oxide copolymer with polyethylene oxide in place of the conventional liquid electrolyte.

The disclosed electrolytic capacitor employing said polymer electrolyte with the mobile alkali metal ions has, however, a drawback in that the alkali metal ions are liable to diffuse into the dielectric substance layer. In such a case, the thus diffused alkali metal ions might sometimes cause to lower the dielectric constant of the dielectric substance, and finally invite a short-circuit in the capacitor.

In order to solve such problems, an employment of ammonium ions instead of such alkali metal ions for the electrolyte has been considered to be effective. It has hithertofore been well known that the ionic conductivity of the polymer electrolyte including the ammonium ions is generally very low as compared with those including alkali metal ions. Moreover, it has another drawbacks in that the ionic conductivity of such an electrolyte is remarkably lowered at a low temperature region ("Electric Conductive Polymers" by Naoya OGATA, published by KODANSHA Scientific Inc., Japan, 1990).

And, since the ionic conductivity of the electrolyte constituting the electrolytic capacitor reversely corresponds to the impedance of the capacitor, it is practically difficult to employ such an electrolyte if it has too small ionic conductivity.

In the case of employing such an ionic conductive polymer electrolyte in an electrolytic capacitor, it is a very important requirement to obtain an electrolyte having a high ionic conductivity by optimally combining a base polymer with an ammonium salt. The teaching in Tokkai (Japanese Unexamined Patent Publication) Hei 1-503,425 is however silent about how to realize a concrete example of such an electrolyte having sufficient ionic conductivity.

Further, hitherto aluminum oxide has widely been employed as the dielectric substance for the electrolytic capacitors. In practical configuration, an aluminum oxide layer of a thickness of 100 angstrom in a micro-pore state can be obtained by electrochemically anodizing a surface of an aluminum electrode in a weakly acidic electrolyte. The surface of the aluminum electrode has previously been etched in order to realize an extended surface area for a large capacitance. Therefore, the anodized aluminum oxide layer has a finely roughened (satin-like finished) surface configuration.

If a non-liquid electrolyte such as the abovementioned polymer electrolyte is employed, its contacting and adhering area formed over the surface of the aluminum oxide layer in the micro-pore state might however be considerably smaller as compared with the corresponding area in the conventional configuration that employs a liquid electrolyte. Further, it is easy to consider that the non-liquid electrolyte such as said polymer electrolyte might gradually rip off from the surface of the aluminum oxide layer with the repeated cycles of charge/discharge operation.

Thus, in the manufacturing of the electrolytic capacitor containing the non-liquid electrolyte, it is a still unsolved problem to joint the electrolyte, and the dielectric substance layer at a wide surface area while maintaining a powerful contacting and adhering force.

OBJECT AND SUMMARY OF THE INVENTION

It is therefore the primary object of the invention to provide an electrolytic capacitor that has effectively solved the above-states problems.

It is another object of the present invention to provide an effective method for producing the above-stated electrolytic capacitors.

According to the present invention, there is provided an electrolytic capacitor comprising:

a housing with an insulator lid or a protective coating layer, which encloses the following components, a pair of electrodes, consisting of an anode with a dielectric substance layer of a metal oxide formed thereon and an electrically conducting cathode, a pair of lead conductors respectively connected to said anode and cathode, an electrolyte layer which is disposed between said dielectric substance layer formed on said anode and said cathode and comprises at least one ammonium salt and at least one polyether polyol having a skeletal structure represented by the formula:

where, each of Rs independently represents a hydrogen atom, an optionally substituted isocyanate residue or acrylic residue which may be the same as or different from one another, $m_1$, $m_2$, $m_3$, $n_1$, $n_2$ and $n_3$ each represents a positive integer, and the ends of the isocyanate residues or acrylic residues are 3-dimensionally linked.

In the above-defined electrolytic capacitor, the polyether moiety of said polyether polyol may usually be a random co-polymer composed of oxyethylene and oxypropylene.

In the above-defined electrolytic capacitor, said electrolyte may further comprise electric conductive carbon fine powder in a specified quantity.

In the above-defined electrolytic capacitor, said polyether polyol may have, depending on necessity, isocyanate residues, whose ends are 3-dimensionally linked.

In the case of above-defined isocyanate substituted polyether polyol, said electrolyte may further comprise at least one plasticizer selected from the group consisting of propylene carbonate, ethylene carbonate, sulfolane and a polyalkylene glycol dimethyl ether.

In the above-defined electrolytic capacitor, said polyether polyol may alternately have acrylic residues, whose ends are preferably linked by an irradiation with an ultraviolet beam or with an electron beam.

In the case of above-defined acrylic substituted polyether polyol, said electrolyte may further comprises; at least one plasticizer selected from the group consisting of propylene carbonate, ethlene carbonate, sulfolane, diethylene glycol, triethylene glycol, tetraethylene glycol, polyethylene glycol and a polyalkylene glycol dimethyl ether.

In the above-defined electrolytic capacitor, said ammonium salt is preferably at least one selected from the group consisting of ammonium adipate, ammonium azelate, ammonium benzoate, ammonium borodisalicilate, tetramethylammonium borodisalicilate, tetraethylammonium paratoluenesulfonate, ammonium γ-resorcinate, tetramethylammonium borofluonate, tetraethylammonium borofluonate, tetramethylammonium hexafluorophospate and tetraethylammonium hexafluorophosphate, or a mixture thereof.

In the above-defined electrolytic capacitor, the ratio by weight (W/Z) of said plasticizer W to polyether polyol Z is preferably larger than 0 and smaller than 5, i.e.:

$$0 \leq (W/Z) \leq 5.$$

In addition to this, the ratio in number of the oxygen atoms Y constituting said polyether polyol included in said electrolyte to the molecules X of said ammonium salt included in said electrolyte is preferably larger than 20 and smaller than 50, i.e.:

$$20 \leq (Y/X) \leq 50.$$

In the above-defined electrolytic capacitor, the ratio Q by weight of said electric conductive carbon fine powder included in the electrolyte to the total of the latter is preferably not smaller than 0.1 but not larger than 0.5 i.e.:

$$0.1 < Q < 0.5.$$

According to another aspect of the present invention, there is provided a method for the production of the above-defined electrolytic capacitor; which comprises:

dissolving electrolytic substance in an organic solvent to make a solution for the polymer electrolyte, extending said fluid electrolyte over the surface of the dielectric substance layer formed on the anode, assembling said anode with the cathode to form a capacitor element, and curing the extended solution for the polymer electrolyte to solidify itself.

According to an another mode in the method of the present invention, said high polymer electrolyte layer may alternatively formed by impregnating a porous carrier composed of an electrically insulating material with said electrolyte solution, and the impregnated porous carrier may be disposed between a dielectric substance layer formed on the anode and the electrically conducting cathode, and then the electrolyte solution may be cured to solidify itself.

The present inventors have now found that if the above-specified compound is employed as a component for formulating the polymer electrolyte of the invention, it is possible to manufacture an electrolytic capacitor having a low impedance and an excellent durability which will not be deteriorated after it is undergone the repeated charge/discharge cycles.

In addition, the present inventors have found that when electric conductive carbon fine powder is incorporated in the electrolyte in a specified amount, it is possible to manufacture an electrolytic capacitor with a low impedance which will not be increased in an environment at a particularly low temperature. This phenomenon can safely be considered to be attributable to the action of the added carbon in the specified amount, which is supposed to be effective for decreasing the impedance of the polymer electrolyte.

Further, by the above-defined production method, the polymer electrolyte solution, which is prepared by dissolving the base polymer and electrolyte salt in the specified organic solvent, can be made to penetrate into the micropores formed in the aluminum oxide dielectric substance layer and to cure itself therein. Therefore, if this method is employed, it is possible to manufacture a more practical capacitor element for an electrolytic capacitor of a larger capacitance for a given space.

In addition, by an alternative production method, the porous separator consisting of an electrically insulating material can be impregnated with the polymer electrolyte solution prepared by dissolving the electrolyte material in the organic solvent. The impregnated separator can be closely disposed between the dielectric substance layer and the electrically conductive cathode to be cured itself therebetween. Therefore, if this method is employed, it is possible to realize an improvement in the stability of the capacitor element quality.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

In the following paragraphs, preferred embodiments of the present invention will be described in more detail with reference to the following Working Examples contrasted with Comparison Examples.

Working Example 1

Figure 1:
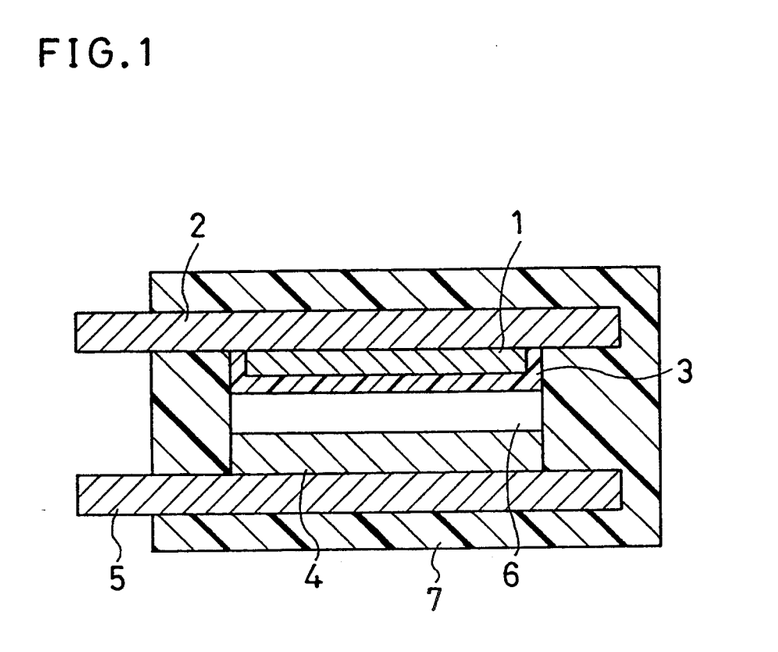
FIG. 1 is a cross-sectional view of an electrolytic capacitor built in accordance with the present invention.

Effect of an Ammonium Salt and Effect Attributable to a Method of Production Referring now to FIG. 1, there is shown a schematic cross-sectional view of an electrolytic capacitor built in accordance with the present invention. One side of the surface of an aluminum anode 1 is anodized to be covered with a dielectric substance layer 3 of aluminum oxide, while the other side thereof is spot-welded with a lead conductor 2. On one side of the surface of a cathode 4, there is welded another lead conductor 5, and a polymer electrolyte layer 6 combined with a separator is disposed between the dielectric substance layer 3 of the aluminum anode 1 and the cathode 4 to form a laminated body. The laminated body is hermetically sealed in an insulator housing 7.

The anode 1 was prepared first by spot-welding an etched aluminum foil of 1 cm×1 cm square with 0.1 mm thickness and of the etched pores of the diameter ranging from about 1 μm to about 5 μm, with the lead conductor 2. Then the aluminum foil with the lead conductor 2 was anodized in an aqueous solution of boric acid (concentration: 80 g/L) kept at a temperature of 90° C., with a current of 100 mA for 15 minutes, to be covered with the dielectric substance layer 3 of aluminum oxide.

The cathode 4 was prepared by spot-welding an etched aluminum foil of 1 cm×1 cm square with 0.1 mm thickness and with the etched pores of the diameter ranging from about 1 μm to about 5 μm, with the lead conductor 5.

A base liquid for the polymer electrolyte layer 6 is prepared by dissolving 4.4 g of the compound:

where, Rs are isocyanate residue and $(1+m_{1,2,3}) \times n_{1,2,3} = 50$, and 0.52 g of ammonium borodisalicilate in a mixture formed with 175 g of diethylene glycol and 4 ml of methyl ethyl ketone, and intimately mixed with stirring. It is to be noted that the component ratio of this polymer electrolyte solution satisfies a relationship:

$$Y/X = 50,$$

where, X is the number of the molecules of the ammonium salt included in the electrolyte while Y is the total number of the oxygen atoms constituting the polymer compound (1) included in the electrolyte.

The resultant base liquid was used in impregnating a separator 8 (in the drawing, depicted as an integral body with the polymer electrolyte layer 7) of polypropylene of 50% void ratio (porosity), of 1 cm×1 cm square with 0.1 mm thickness, and the impregnated separator 7 was faced with and pressed against both the dielectric substance layer 3 of the anode 1 and the naked aluminum surface of the cathode 4 to form a laminated body. By keeping the laminated body at a temperature of 90° C. for 3 hours, the base liquid for the electrolyte was cured to form the polymer electrolyte layer 6.

An aging process was performed by applying a DC-voltage of 500 V on the lead conductors at a temperature of 85° C. for 3 hours.

Then, the cured laminated body was sealed by embedding it in the housing 7 of an epoxy resin to complete the electrolytic capacitor A.

Comparison Example 1

An electrolytic capacitor B was prepared in the same manner as in that described in Working Example 1, except for the use of 0.18 g of lithium perchlorate in lieu of 0.52 g of ammonium borodisalicilate in Working Example 1, as the Comparison Example 1.

Comparison Example 2

An electrolytic capacitor C was prepared with the same material as those of the electrolytic capacitor A. In this case however, the electrolyte layer 6 was formed first by previously curing the base fluid at 90° C. for 3 hours, and then the cured layer of 0.1 mm thickness is closely disposed between the anode 2 and the cathode 4 by pressing the laminated components with heat at 100° C. for one hour. Except for these, the procedure of the Working Example 1 was generally followed.

Evaluation 1

Comparisons as regards the impedances, the capacitances, and their frequency characteristics as well as the cyclic life characteristics in charge/discharge experiments were conducted on the electrolytic capacitor A, which was prepared in the Working Example 1 and the electrolytic capacitors B and C prepared in the Comparison Examples 1 and 2, respectively. The results of the comparison are summarized in FIGS. 2, 3 and 4, respectively.

Figure 2:
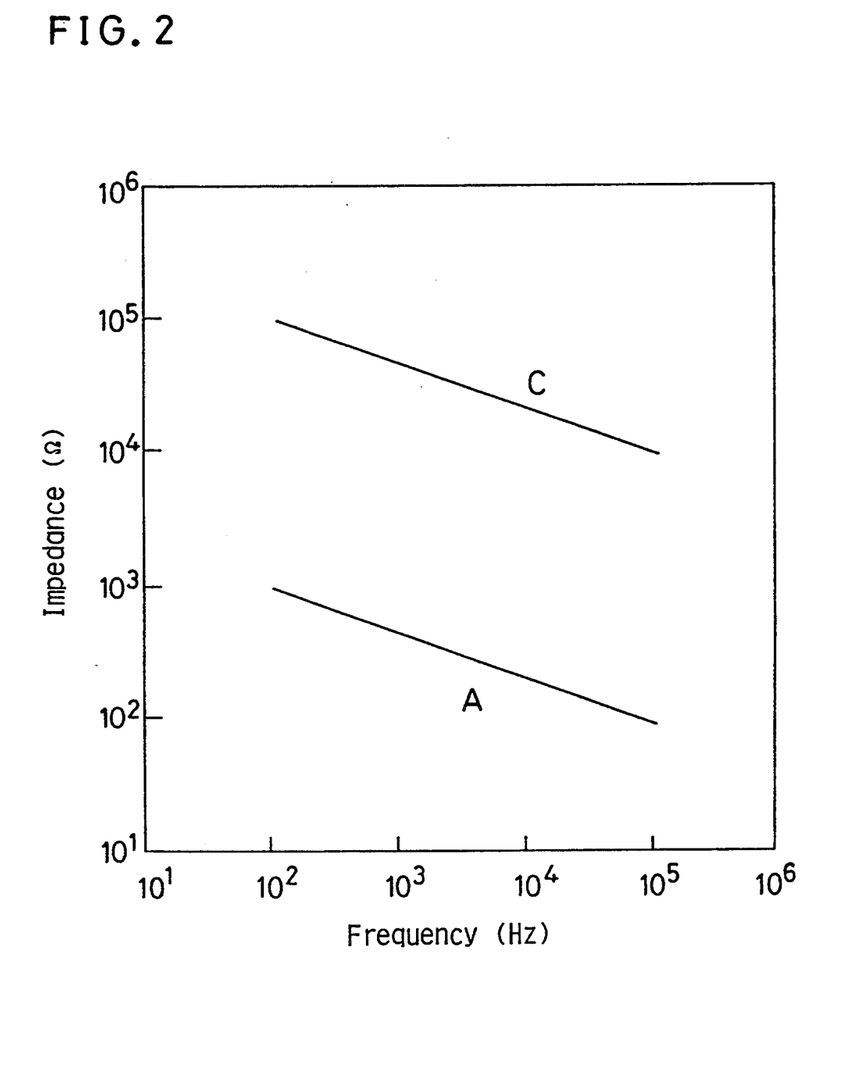
FIG. 2 is a graph showing the impedance versus frequency characteristics of the electrolytic capacitors built in accordance with Working Example 1 and Comparison Example 2.

In FIG. 2, the abscissa and the ordinate of the graph represent the frequency used in the measurement and the impedance obtained at the measurement, respectively. As shown in FIG. 2, it is found that the impedance of the electrolytic capacitor C of the Comparison Example 2, which differs in the manner of forming the electrolyte layer, is very high as compared with that of the electrolytic capacitor A of the Working Example 1 in the frequency range of the measurement.

Figure 3:
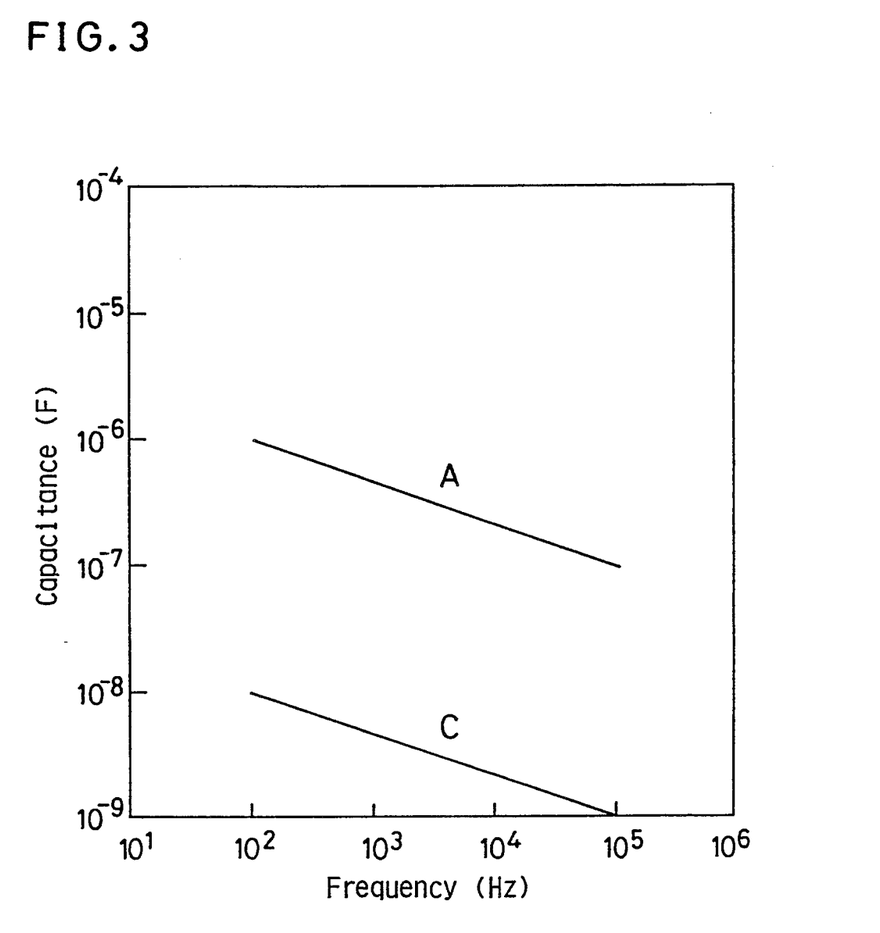
FIG. 3 is a graph showing the capacitance versus frequency characteristics of the electrolytic capacitors built in accordance with Working Example 1 and Comparison Example 2.

In FIG. 3, the ordinate and the abscissa of the graph represent the capacitance and the frequency used in the measurement, respectively. In this evaluation, it is understood that the capacitance of the electrolytic capacitor C of the Comparison Example 2, which differs in the manner of forming the electrolyte layer, is very small as compared with that of the electrolytic capacitor A of the Working Example 1 over the measurement frequency range.

From the above-mentioned results, it is found that the production method of the present invention is an extremely useful for producing an electrolytic capacitor employing a polymer electrolyte, in decreasing the impedance and increasing the capacitance of the product.

Figure 4:
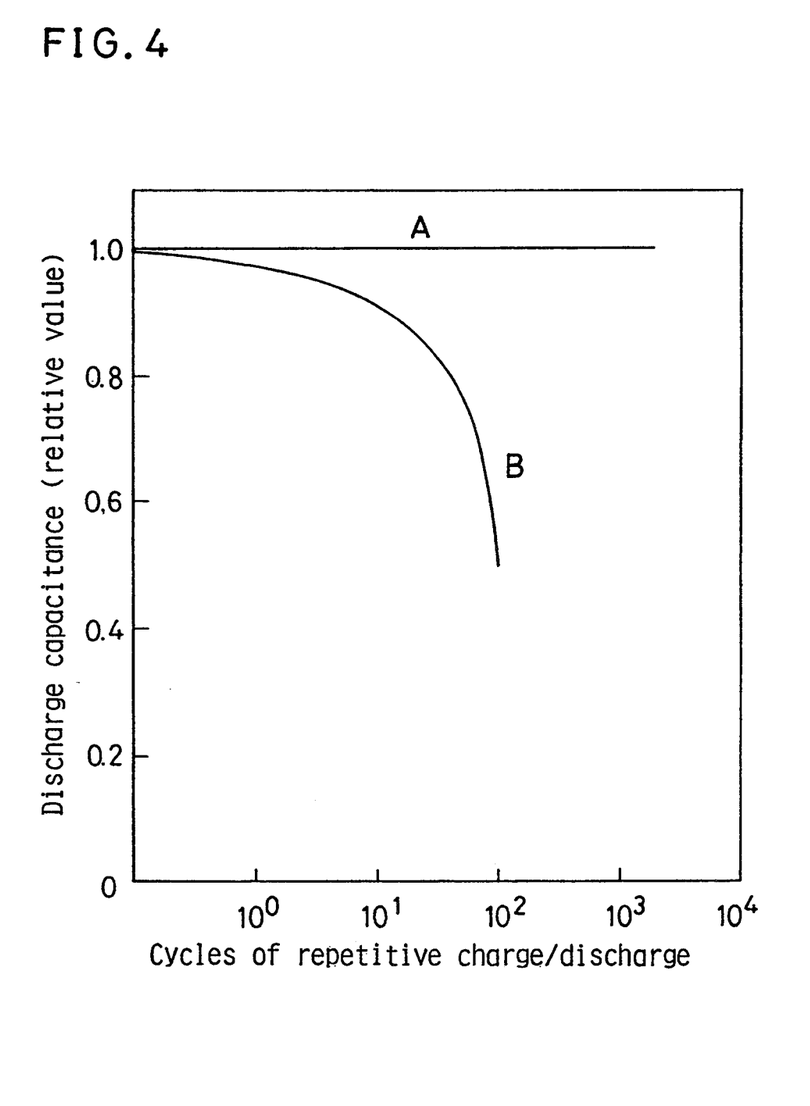
FIG. 4 is a graph showing the discharge capacitance versus the repetition number of charge/discharge cycle characteristics of the electrolytic capacitors built in accordance with Working Example 1 and Comparison Example 1.

On the other hand, in FIG. 4, the ordinate represents the relative values for the initial discharge capacitances, while the abscissa represents the number of the repetitive cycles in charge/discharge test. The discharge capacitances were evaluated first by charging the electrolytic capacitors A and B at 500 V for 10 minutes, and then by measuring the total quantities of electricity moved across the pairs of the electrodes in a short-circuited state for 5 minutes.

From the above-mentioned results, it is confirmed that the electrolytic capacitor B of the Comparison Example 1 suffers from a deterioration in the early stage of reducing its capacitance with the repetitive cycles of the charge/discharge operation, whereas the electrolytic capacitor A of the Working Example 1 maintains its initial performance even after the repetition for 1000 cycles or more.

Although methyl ethyl ketone is used as the solvent in the Working Example 1, it is confirmed that a similar advantage can be obtained by using any of acetone, tetrahydrofuran, propylene carbonate, ethylene carbonate, and a polyalkylene glycol dimethyl ether.

Working Example 2

Effect of the Various Ammonium Salts

Electrolytic capacitors D, E, F, G, H and I were prepared in the same manner as that described in Working Example 1 but using ammonium adipate in the capacitor D, ammonium azelate in the E, ammonium benzoate in the F, tetramethylammonium borodisalicilate in the G, tetraethylammonium paratoluene sulfonate in the H, and ammonium γ-resorellate in the I, respectively, in lieu of ammonium borodisalicilate used in Working Example 1, in varying composition ratios of Y/X.

Evaluation 2

Figure 5:
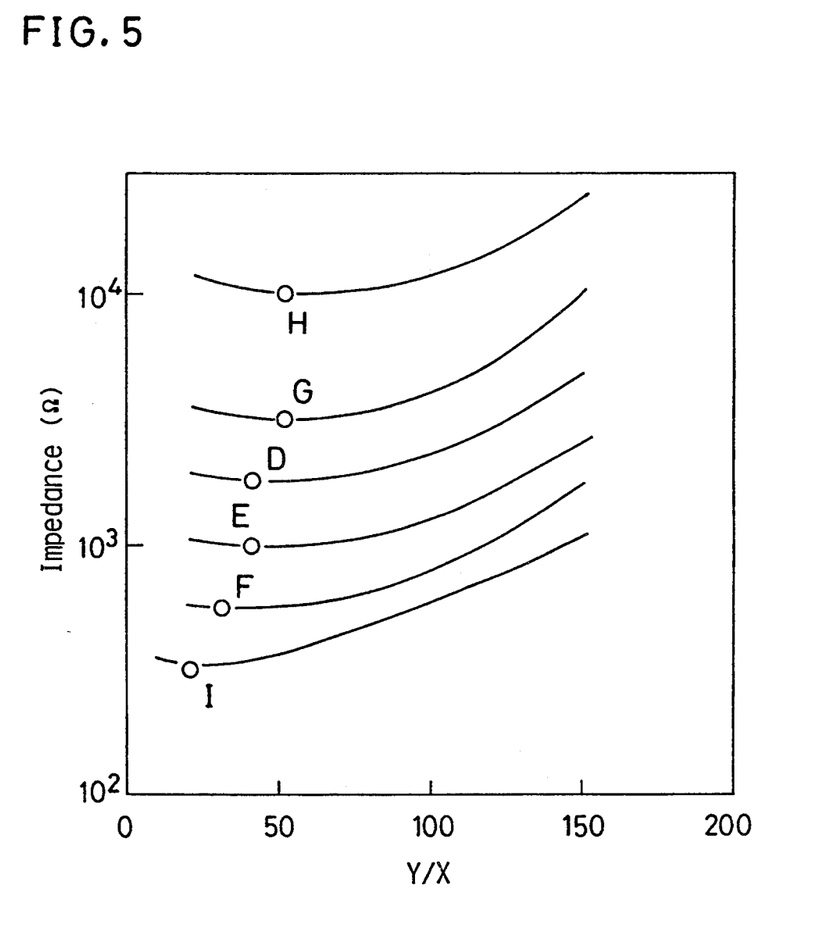
FIG. 5 is a graph showing the impedance versus composition ratio (Y/X) of the electrolytic capacitors built in accordance with Working Examples 2.

The impedance values of these electrolytic capacitors measured at 100 Hz are shown in FIG. 5, wherein the ordinate represents the impedance values and the abscissa represents the above-stated composition ratios Y/X.

From the above results of the measurements, it is understood that an optimum result is obtained when the relation between the number of molecules X of the ammonium salt included in the electrolyte and the total number of the oxygen atoms Y constituting the polymer compounds (1) is in the range defined:

$$20 \leq (Y/X) \leq 50.$$

Working Example 3

Effect of the Addition of Polyalkylene Glycol Dimethyl Ether

An anode was prepared first by spot-welding an etched aluminum foil of 1 cm×10 cm rectangle with 0.05 mm thickness and of the etched pores of the diameter ranging from about 1 μm to about 5 μm, with a lead conductor. Then the aluminum foil with the lead conductor was anodized in an aqueous solution of boric acid (concentration: 80 g/L) kept at a temperature of 90° C., with a current of 1 A for 15 minutes, to be covered with the dielectric substance layer of aluminum oxide.

A cathode was prepared by spot-welding an etched aluminum foil of 1 cm×10 cm rectangle with 0.05 mm thickness and of the etched pores of the diameter ranging from about 1 μm to about 5 μm, with another lead conductor.

A polymer electrolyte solution for the layer 6 was prepared by dissolving 4.4 g of the compound:

where, Rs' are isocyanate residue and $(1+m_{1,2,3}) \times n_{1,2,3} = 50$, and 0.52 g of ammonium borodisalicilate, in 0.175 g of diethylene glycol, 4 ml of acetone and various amounts of polyethylene glycol dimethyl ether (molecular weight: 275), and intimately mixing by stirring.

It is to be noted that the component ratio of this base liquid is selected to correspond to a relation W/Z, where, W is the weight of the plasticizer and Z is the total weight of the polymer compound (1) constituting the electrolyte.

The resultant base liquid was used in impregnating a separator of polypropylene of porosity: 50%, of 1 cm×10 cm rectangle with 0.05 mm thickness, and the impregnated separator was faced with and pressed against both the dielectric substance layer of the anode and the naked aluminum surface of the cathode. After keeping the laminated object at a temperature of 90° C. for 30 minutes, it was wound in a roll, and the electrolyte solution for the polymer electrolyte is cured to form the polymer electrolyte layer by further keeping the wound roll at the same temperature for 3 hours.

Finally, the wound roll was housed in an aluminum tube and its lead conductor parts were sealed with an epoxy resin to complete the electrolytic capacitors J.

Evaluation 3

Figure 6:
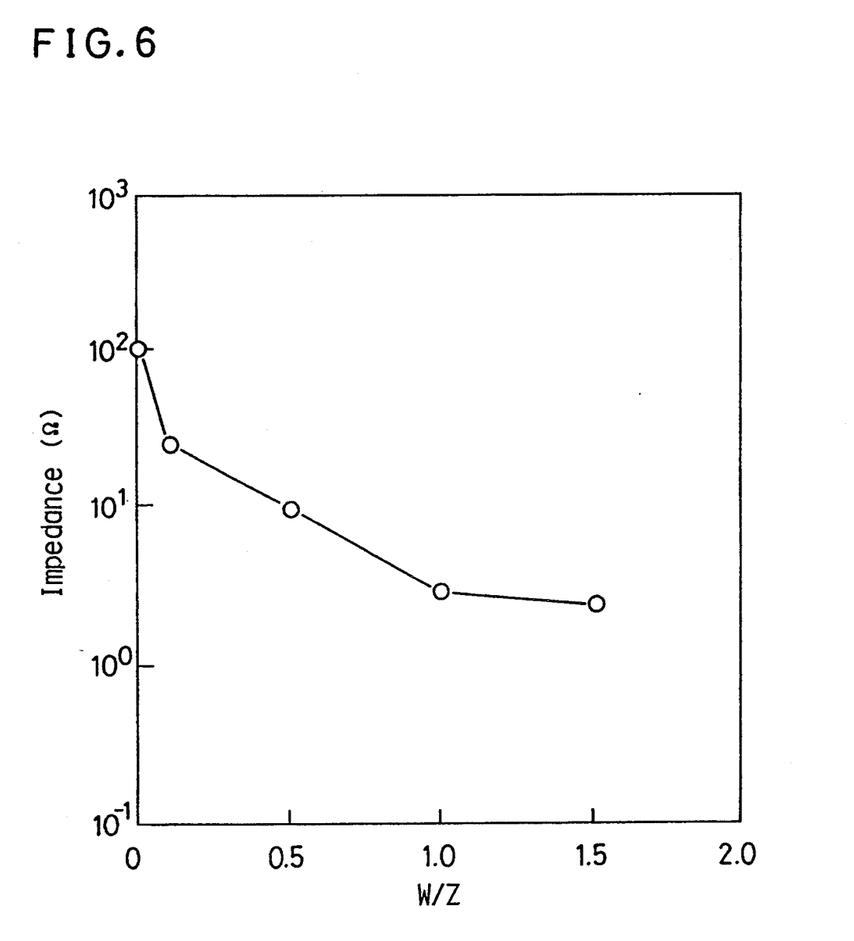
FIG. 6 is a graph showing the impedance versus weight ratio (W/Z) of the electrolytic capacitor built in accordance with Working Example 3.
Figure 7:
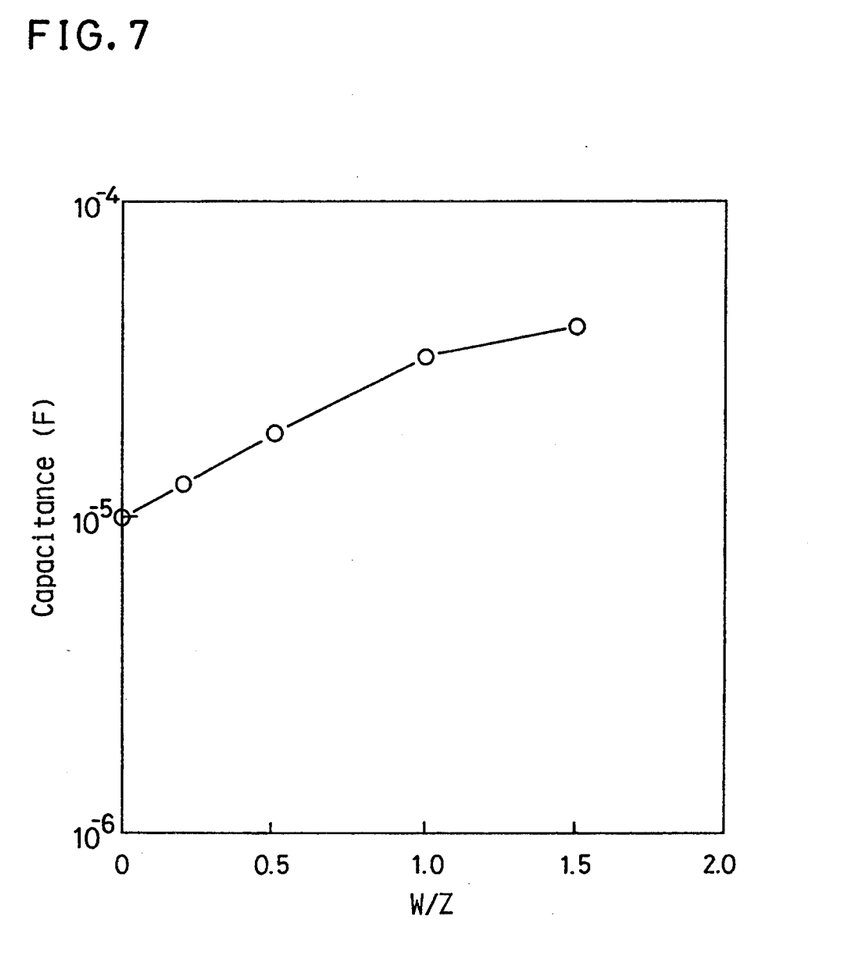
FIG. 7 is a graph showing the capacitance versus weight ratio (W/Z) of the electrolytic capacitor built in accordance with Working Example 3.
Figure 8:
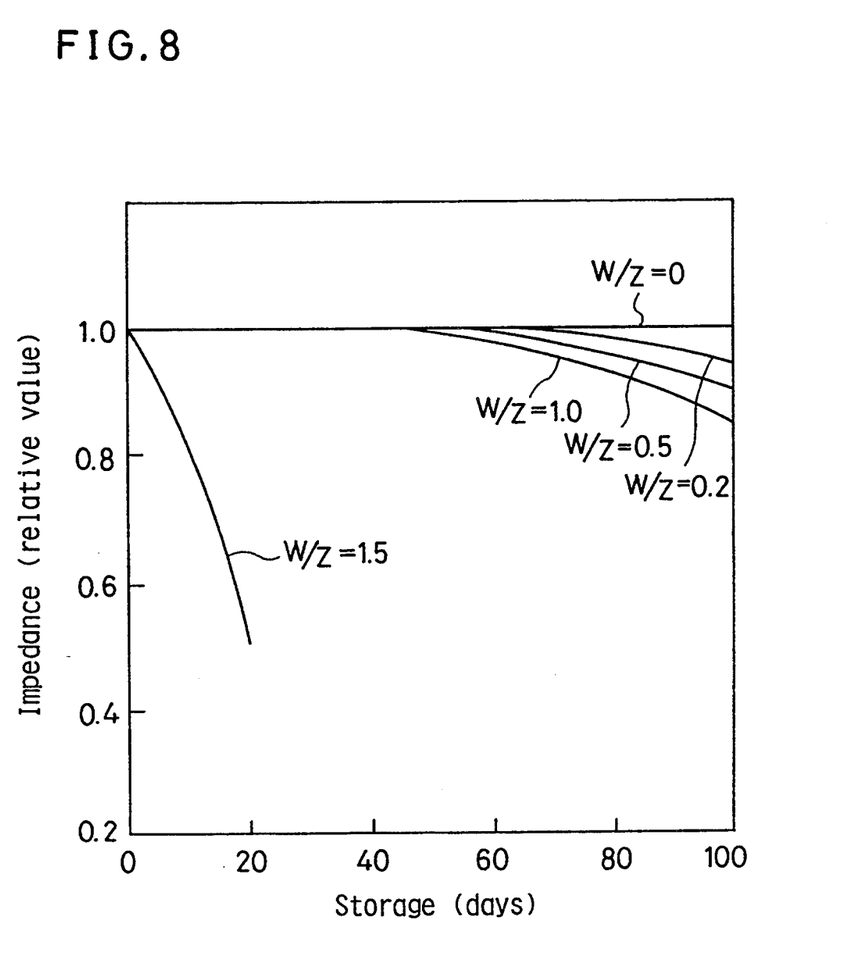
FIG. 8 is a graph showing the impedance versus length of the storage (days) of the electrolytic capacitors built in accordance with Working Example 3, with varying W/Z ratio.

An evaluation with regard to impedances and capacitance measured at 100 Hz and to deterioration in the impedance at 30° C. after storage at 80° C. was conducted on the electrolytic capacitors J with the varying ratio of W/Z, and the results thereof are summarized in FIGS. 6, 7 and 8, respectively.

In FIG. 6, the ordinate and the abscissa of the graph represent the tempedances of the capacitors J at 100 Hz and the composition ratio W/Z of the electrolyte, respectively. On this evaluation, it is found that the larger the component ratio W/Z, (i.e., the ratio of the weight W of the polyalkylene glycol dimethyl ether to the weight Z of the high molecular compound (1) constituting the electrolyte), the smaller the impedance of the electrolytic capacitor J becomes.

In FIG. 7, the ordinate and the abscissa of the graph represent the capacitances of the electrolytic capacitors J measured at 100 Hz and the composition ratio W/Z of the electrolyte. In this evaluation, it is understood that the capacitance of the electrolytic capacitor J increases with the increase in the component ratio W/Z of the electrolyte, and saturates at a certain quantity and then begins to decrease.

In FIG. 8, the ordinate of the graph represents the impedance (relative value) of the electrolytic capacitor J measured at 30° C. after the storage at 80° C., while the abscissa represents the days for the storage. In this evaluation, it is understood that the deterioration in the impedance of this capacitor increases with the increase in the composition ratio W/Z of the polyethylene glycol dimethyl ether in the electrolyte.

From the above-stated results of the evaluations, it is confirmed that an electrolytic capacitor having a favorable Initial performance and a high reliability for a long service can be obtained when the relation between the weight Z of the polymer compound (1) constituting the electrolyte and the weight W of the polyalkylene glycol dimethyl ether incorporated in the electrolyte is selected to be $0 \leq (W/Z) \leq 1$.

Working Example 4

Effect of the Addition of Electric Conductive Carbon

An anode was prepared first by spot-welding an anode lead conductor onto an etched aluminum foil of 11 cm×2 cm rectangle with 0.05 mm thickness with etched pores of the diameter ranging from about 1 μm to about 5 μm. Then the aluminum foil with the anode lead conductor was anodized in an aqueous solution of boric acid (concentration: 80 g/L) kept at a temperature of 90° C., with a current of 2 mA for 15 minutes, followed by covering with the dielectric substance layer of aluminum oxide.

A cathode was prepared by spot-welding a cathode lead conductor onto an etched aluminum foil of 11 cm×2 cm rectangle with 0.1 mm thickness with etched pores of the diameter ranging from about 1 μm to about 5 μm.

An electrolyte solution for the polymer electrolyte layer was prepared by dissolving 100 g of the compound:

therefor.

where, Rs' are acrylic residue and $(1+m_{1,2,3}) \times n_{1,2,3} = 50$, 16.8 g of ammonium benzoate and 100 g of electric conductive carbon fine powder, in 200 g of diethylene glycol and 200 ml of methyl ethyl ketone, and intimately mixed with stirring.

The resultant electrolyte solution was extended over the surface of the dielectric substance layer of said anode and cured so as to form a layer of polymer electrolyte of 0.1 mm thickness by irradiating the extended base liquid with electron beam (acceleration voltage: 700 KeV and irradiation beam quantity: 1 Mrad). Thereafter, the naked aluminum surface of the aforementioned cathode is laminated on and pressed against the thus formed polymer electrolyte layer.

An aging process was performed by applying a DC-voltage of 500 V on the lead conductors at a temperature of 85° C. for 3 hours.

Finally, the whole of the laminated body was sealed by embedding it in an epoxy resin to complete the electrolytic capacitor K of the Working Example 9.

Comparison Example 3

For comparison to this, an electrolytic capacitor L was prepared with the same material as those in the electrolytic capacitor K and in the same manner as those in the Working Example 4, except for the omission of the electric conductive carbon fine powder in the polymer electrolyte.

Evaluation 4

Figure 9:
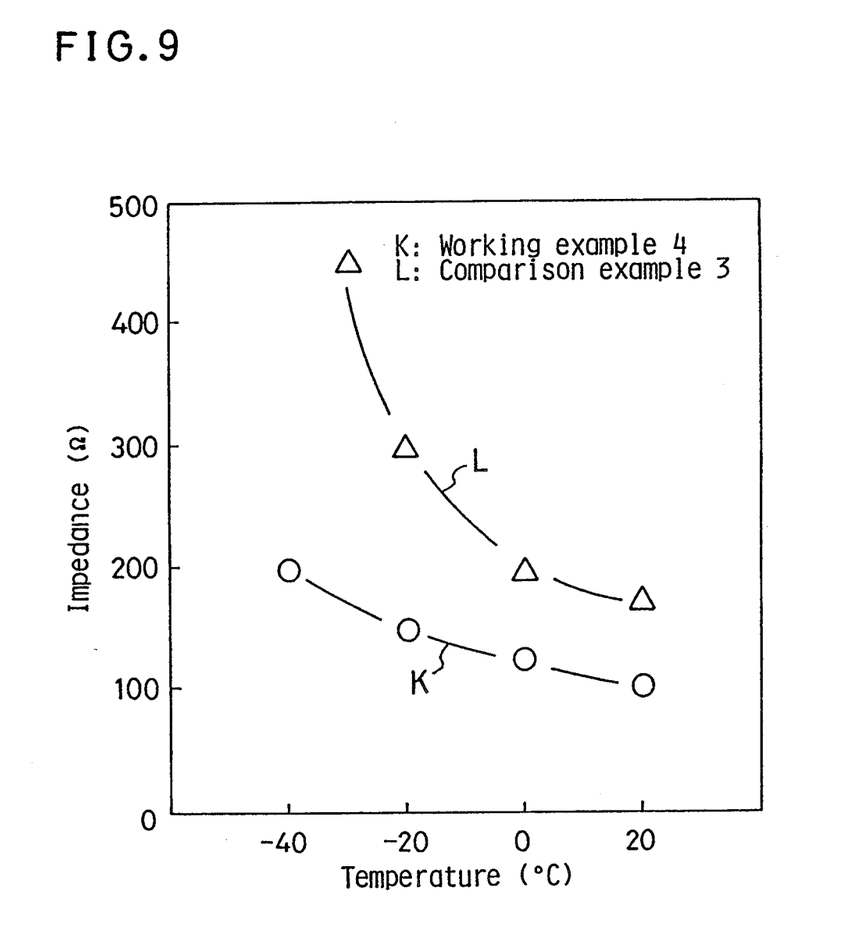
FIG. 9 is a graph showing the impedance versus temperature characteristics of the electrolytic capacitors built in accordance with Working Example 4 and Comparison Example 3.
Figure 10:
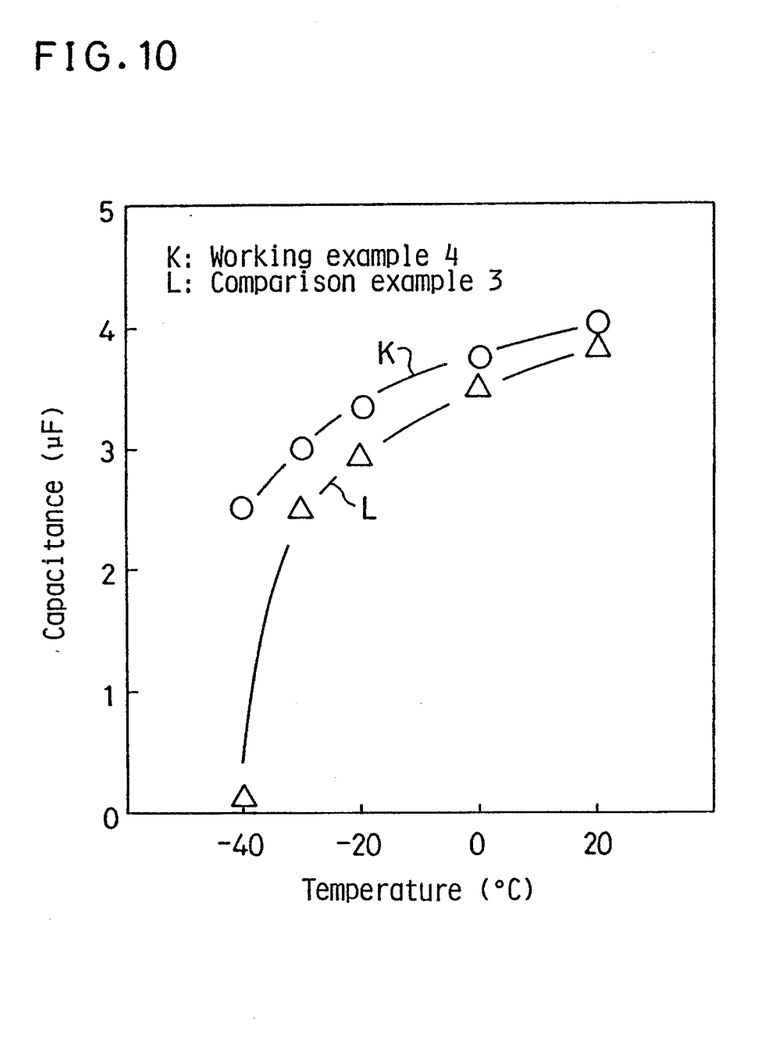
FIG. 10 is a graph showing the capacitance versus temperature characteristics of the electrolytic capacitors built in accordance with Working Example 4 and Comparison Example 3.

A comparison as regards the temperature dependency characteristics of the impedances and capacitances measured at 120 Hz was conducted on the electrolytic capacitors K and L, and the results thereof are summarized in FIGS. 9 and 10, respectively.

In FIG. 9, the ordinate and the abscissa of the graph represent the impedance of the capacitors and the temperature at the measurement, respectively. In FIG. 10, the ordinate and the abscissa of the graph represent the capacitance of the capacitors and the temperature at the measurement, respectively.

From the above-mentioned results of the evaluations, it is confirmed that an incorporation of electric conductive carbon fine powder in a specified quantity in the polymer electrolyte is extremely effective as a means for improving the characteristics of an electrolytic capacitor, which employs a polymer electrolyte particularly in a low temperature environment.

Although ammonium benzoate and diethylene glycol are used as the ammonium salt and the plasticizer constituting the polymer electrolyte, it is further confirmed that a similar advantage will be obtained by employing at least one of the ammonium salt selected from the group consisting of ammonium adipate, ammonium azelate, ammonium borodisalicilate, tetramethylammonium borodisalicilate, tetraethylammonium paratoluenesulfonate, ammonium γ-resorcinate, tetramethylammonium borofluonate, tetraethylammonium borofluonate, tetramethylammonium hexafluorophospate, and tetraethylammonium hexafluorophosphate, or a mixture thereof, and any of the plasticizer selected from the group consisting of propylene carbonate, ethlene carbonate, sulfolane, triethylene glycol, tetraethylene glycol, polyethylene glycol and a polyalkylene glycol dimethyl ether.

Working Example 5

Effect of the Quantity of the Added Electric Conductive Carbon

In the foregoing Working Example 4, the fixed weight ratio {(the weight of the carbon)/(the weight of the base polymer compound +the weight of the carbon)}=0.3 is used in the electrolytic capacitor K. In this Working Example, eight electrolytic capacitors M, N, O, P, Q, R, S and T were prepared for various the weight ratios of 0.1, 0.2, 0.3, 0.4, 0.5, 0.6, 0.7 and 0.8, respectively, and their performances were evaluated.

These eight capacitors were prepared with the same material and in the same manner as those used in the electrolytic capacitor J, except that the stated quantities of the carbon were incorporated at the preparation of the base liquid for the electrolyte and that no aging process was performed.

Evaluation 5

The impedances of these capacitors at 20° C. and 120 Hz, and the sparking voltages at the time of electrifying the capacitors at a current density of 100 $\mu A/cm^2$ electrified with the anode of the element to be positive were measured. The results of the measurements are summarized in the below-mentioned Table 1,

TABLE 1

| Capacitor | Carbon ratio | Impedance ($\Omega$) | Sparking voltage (V) |
|---|---|---|---|
| M | 0.1 | 330 | 400 |
| N | 0.2 | 200 | 350 |
| O | 0.3 | 100 | 200 |
| P | 0.4 | 50 | 150 |
| Q | 0.5 | 40 | 100 |
| R | 0.6 | 30 | 20 |
| S | 0.7 | 20 | 10 |
| T | 0.8 | 10 | 5 |

As shown by Table 1, it is found that with the increase of the amount of carbon incorporated in the electrolyte, the impedance of the electrolytic capacitor which employs the electrolyte is improved but the spark generating voltage is lowered. From these results, it is confirmed that an electrolytic capacitor of high utility is obtainable, when the carbon is incorporated in a weight ratio ranging from 0.1 to 0.5 of the total weight of the electrolyte.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electrolytic capacitor comprising at least a housing with an insulator lid or a protective coating layer, which encloses the following components,
    a pair of electrodes, i.e., an anode with a dielectric substance layer of a metal oxide formed thereon and an electrically conducting cathode,
    a pair of lead conductors each of which is connected to said anode or cathode, and
    an electrolyte layer which is disposed between said dielectric substance layer formed on said anode and said cathode, and comprises:
        at least one ammonium salt, and
        at least one polyether polyol having a skeletal structure represented by the formula:

$$CH_2-O-[(C_2H_4O)-(C_3H_6O)_{m1}]_{n1}-R$$
$$CH-O-[(C_2H_4O)-(C_3H_6O)_{m2}]_{n2}-R$$
$$CH_2-O-[(C_2H_4O)-(C_3H_6O)_{m3}]_{n3}-R$$

where, each of Rs' independently represents a hydrogen atom, an optionally substituted isocyanate residue or acrylic residue which may be the same as or different from one another; $m_1$, $m_2$, $m_3$, $n_1$, $n_2$ and $n_3$, each represents a positive integer, and the ends of the isocyanate residues or acrylic residues are 3-dimensionally linked.

2. The electrolytic capacitor in accordance with claim 1, wherein the polyether moiety of said polyether polyol is a random copolymer composed of oxyethylene and oxypropylene.

3. The electrolytic capacitor in accordance with claim 1 or 2 wherein; said electrolyte further comprises electric conductive carbon fine powder.

4. The electrolytic capacitor in accordance with claim 1, wherein said polyether polyol has isocyanate residues whose ends are 3-dimensionally linked.

5. The electrolytic capacitor in accordance with claim 4, wherein said electrolyte further comprises; at least one plasticizer selected from the group consisting of propylene carbonate, ethlene carbonate, sulfolane, and a polyalkylene glycol dimethyl ether.

6. The electrolytic capacitor in accordance with claim 1, wherein; said polyether polyol has acrylic residues whose ends are linked together by an irradiation with an ultraviolet beam or with an electron beam.

7. The electrolytic capacitor in accordance with claim 6, wherein said electrolyte further comprises; at least one plasticizer selected from the group consisting of propylene carbonate, ethlene carbonate, sulfolane, diethylene glycol, triethylene glycol, tetraethylene glycol, polyethylene glycol and a polyalkylene glycol dimethyl ether.

8. The electrolytic capacitor in accordance with claim 1, wherein said ammonium salt is at least one selected from the group consisting of ammonium adipate, ammonium azelate, ammonium benzoate, ammonium borodisalicilate, tetramethylammonium borodisalicilate, tetraethylammonium paratoluenesulfonate, ammonium $\gamma$-resorcinate, tetramethylammonium borofluonate, tetraethylammonium borofluonate, tetramethylammonium hexafluorophospate, and tetraethylammonium hexafluorophosphate, or a mixture thereof.

9. The electrolytic capacitor in accordance with claim 5 or 7 wherein a ratio by weight of said plasticizer to polyether polyol is larger than 0 and smaller than 5.

10. The electrolytic capacitor in accordance with claim 1, wherein a ratio in number of the oxygen atoms constituting said polyether polyol included in said electrolyte to molecules of said ammonium salt included in said electrolyte is larger than 20 and smaller than 50.

11. The electrolytic capacitor in accordance with claim 3, wherein a ratio by weight of said electric conductive carbon fine powder included in the electrolyte to total electrolyte is not smaller than 0.1 and not larger than 0.5.

12. A method for the production of the electrolytic capacitor as claimed in claim 1 or 2, which comprises:
dissolving electrolytic substance in an organic solvent to form an electrolyte solution for the polymer electrolyte, extending said electrolyte solution over the surface of the dielectric substance layer formed on the anode, assembling said anode with the cathode to form a capacitor element, and curing the extended electrolyte solution for the polymer electrolyte to solidify itself.

13. A method for the production of the electrolytic capacitor as claimed in claim 1 or 2, which comprises:

dissolving the electrolytic substance in an organic solvent to form an electrolyte solution for polymer electrolyte, impregnating a porous carrier composed of a electrically insulating material with said electrolyte solution, contacting the porous carrier impregnated with said electrolytic substance to both of a dielectric substance layer formed on the anode and the electrically conducting cathode, assembling said anode, carrier and cathode to form a capacitor element, and curing said electrolyte solution for the polymer electrolyte to solidify itself.

14. A method for the production of the electrolytic capacitor as claimed in claim 5 or 7, wherein:

the electrolytic substance is dissolved in at least one organic solvent selected from the group consisting of acetone methyl ethyl ketone, tetrahydrofuran, propylene carbonate, ethylene carbonate and polyalkylene glycol dimethyl ether to obtain an electrolyte solution for the polymer electrolyte, the electrolyte solution is extended over the surface of the dielectric substance layer, and the extended electrolyte solution is cured to solidify itself.

15. A method for the production of the electrolytic capacitor as claimed in claim 5 or 7, wherein:

the electrolytic substance is dissolved in at least one organic solvent selected from the group consisting of acetone methyl ethyl ketone, tetrahydrofuran, propylene carbonate, ethylene carbonate and polyalkylene glycol dimethyl ether to obtain a fluid electrolyte, a porous carrier composed of a electrically insulating material is impregnated with said fluid electrolyte, the porous carrier impregnated with said electrolytic substance is contacted to both of a dielectric substance layer formed on said anode and the electrically conducting cathode, and said electrolyte solution is cured to solidify itself.

* * * * *